United States Patent [19]

Hsu et al.

[11] 4,374,177
[45] Feb. 15, 1983

[54] AQUEOUS SIZING COMPOSITION FOR GLASS FIBERS AND SIZED GLASS FIBERS FOR THERMOPLASTIC REINFORCEMENT

[75] Inventors: Ed C. Hsu, Pittsburgh; L. Dow Moore, Allison Park; Chester S. Temple, McKees Rocks, all of Pa.

[73] Assignee: PPG Industries, Inc., Pittsburgh, Pa.

[21] Appl. No.: 334,203

[22] Filed: Dec. 24, 1981

[51] Int. Cl.$^3$ .............................................. B32B 9/00
[52] U.S. Cl. .................................... 428/392; 523/437; 523/438; 523/466; 523/467; 524/487; 524/507; 524/318
[58] Field of Search ............... 428/392; 523/437, 438, 523/466, 467; 524/487, 507, 318

[56] References Cited

U.S. PATENT DOCUMENTS

| | | | |
|---|---|---|---|
| 3,556,754 | 1/1971 | Marsden et al. | 65/3 |
| 3,616,185 | 10/1971 | Goldberg | 161/185 |
| 3,655,353 | 4/1972 | Nalley et al. | 65/3 |
| 3,803,069 | 4/1974 | McWilliams et al. | 260/29.2 TN |
| 3,814,592 | 6/1974 | McWilliams et al. | 65/3 |
| 3,814,715 | 6/1974 | Nalley et al. | 260/29.6 XA |
| 3,837,892 | 9/1974 | Marzocchi | 117/62.1 |
| 3,882,068 | 5/1975 | Swartz | 260/29.6 |
| 3,936,415 | 2/1976 | Coakley | 260/42.15 |
| 3,946,132 | 3/1976 | Hedden | 428/378 |
| 4,143,006 | 3/1979 | Workman | 260/17.4 ST |
| 4,194,940 | 3/1980 | Damico et al. | 156/331 |
| 4,240,944 | 12/1980 | Temple | 260/29.6 NR |
| 4,246,145 | 1/1981 | Molinier et al. | 260/7.5 |
| 4,301,052 | 11/1981 | Pollman | 260/29.2 TN |

FOREIGN PATENT DOCUMENTS 50-48233  6/1975  Japan .

OTHER PUBLICATIONS

Product literature from Celanese Polymer Specialties Company directed to Epi-Rez ® epoxy polymers.
Product literature from Hooker Chemical Company, Ruco Division, pertaining to Rucothane polyurethane latexes.

*Primary Examiner*—Melvyn I. Marquis
*Attorney, Agent, or Firm*—Kenneth J. Stachel

[57] ABSTRACT

Glass fibers reinforced polymeric polymers can be produced with high strength properties such as tensile strength, flexural strength and impact strength by using sized glass fiber strands of the present invention. The sized glass fiber strands have a residue of an aqueous sizing composition comprising: aqueous dispersible, emulsifiable, or solubilizable polyurethane polymer, polyepoxide polymer, polyethylene-containing polymer, and wax, where the weight ratio of the polyethylene containing polymer to the wax is in the range of about 25 to 1 to about 1 to 25, and one or more amino silane coupling agents. In addition to the amino silane coupling agent, the sizing composition may have an epoxy silane coupling agent and/or a lubricant modified silane coupling agent. The wax can be deleted from the composition, when the polyethylene-containing polymer has limited branching. The sized glass fiber strands can be produced by conventional forming process or by a wet chopped glass fiber forming process.

28 Claims, No Drawings

AQUEOUS SIZING COMPOSITION FOR GLASS FIBERS AND SIZED GLASS FIBERS FOR THERMOPLASTIC REINFORCEMENT

The present invention is directed to an aqueous treating composition for treating glass fibers during their formation and treated glass fibers for reinforcing thermoplastic polymers.

BACKGROUND OF THE INVENTION

Glass fibers have been used in various forms such as chopped filaments and strands, continuous filaments and strands and sundry mats for reinforcing polymeric materials like thermoplastics and thermosetting materials. These glass fibers are produced from molten streams of glass being attenuated from orifices in a bushing of a glass batch melting furnace. After the glass fibers are formed and have cooled somewhat, an aqueous treating composition, known as a sizing composition, is applied to the fibers to provide protection from interfilament abrasion and to make the glass fibers more compatible with the thermoplastic or thermosetting materials they will reinforce. The glass fibers are then chopped, or gathered into strands and chopped, or gathered into strands to form continuous strands. The chopping process, where the fibers or strands or groups of fibers are chopped during forming, is known as a wet chop process. If the continuous glass fiber strands are subsequently chopped, such a process is known as a dry chop process. In addition, continuous glass fiber strands can be manufactured into continuous glass fiber strand mat. Also, chopped glass fiber strand mat can be produced. All of these glass fiber products are useful in reinforcing thermoplastic and thermosetting polymeric materials to increase the strength and other properties of the polymeric materials.

Thermoplastics are reinforced by incorporating reinforcement such as glass fibers into the thermoplastic polymer matrix. Glass fibers for use in such reinforcements originally consisted of a polymer coated glass fiber roving that was chopped into pellets. The pellets, known as "long glass" products were about ⅛ inch in diameter and about ¼ to ½ inch in length. The development of "short glass" products, where the chopped glass fiber strand is produced by dry chopping sized glass fiber strand roving or producing wet chopped glass fiber strand, involves lengths of the chopped glass fiber strands from around ⅛ to ¼ of an inch. These short glass products have allowed for the production of reinforced thermoplastics by extrusion blending of a mixture of resin and chopped glass fibers. Reinforced thermoplastics can be prepared to contain glass fibers in levels ranging from about 10 to 55 percent on a weight basis. With short glass products, it is possible to achieve the desired glass content by blending moldable thermoplastic polymer containing glass fibers with a non-reinforced moldable thermoplastic polymer. For example, a fiber glass reinforced polymer concentrate having a glass content of 40 percent by weight or greater can be blended with unreinforced polymer to achieve the desired reduced level of glass reinforcement in the blended moldable product. Thermoplastic resins that are useful in producing reinforced thermoplastic products include such polymers as polyamides, polystyrenes, styrene-acrylonitrile copolymers, acrylonitrile-butadiene-styrene terpolymers, polycarbonates, polypropylenes, polyethylenes, polyacetals, polysulfones, polyurethanes, polyphenylene-oxides, and thermoplastic polymers like polybutylene terephthalates and polyethylene terephthalates.

The glass fiber strands that have been used in producing short glass for polymeric reinforcement are coated by applying a treating or sizing composition to the glass fibers as they are formed. This sizing composition usually contains a lubricant, a coupling agent, and a film forming polymer such as poly(vinyl acetate). The selection of these types of components for the sizing component can be crucial to the properties of the resultant glass fiber reinforced polymer. For example, it is known in the art that the proper selection of a coupling agent has a significant effect on the properties of resultant reinforced thermoplastics.

In the production of high performance polymeric materials, in addition to characteristics obtained as a result of the high performance properties of the polymer, these materials would be expected to have good strength properties because of the presence of the glass fibers. For instance, in reinforcing high performance thermoplastic polymers, it would be expected to achieve a high performance reinforced polymeric material with good tensile and impact strength so that the resultant properties of the high performance polymer can be used most advantageously. One such high performance polymer is polycarbonate which is a polyester of carbonic acid. Glass fibers have been used to reinforce polycarbonate at levels of reinforcement in the range of 10–40% glass fibers. It has been reported in *Modern Plastics*, Volume 43 at page 102, that polycarbonate resin reinforced with short glass fiber strand at a 20% glass content gives a tensile strength at 73° F. (23° C.) of 12,000–18,500 PSI (827–1276 Bars), an elongation at 73° F. (23° C.) of 2.5–3.0%, a flexural strength at 73° F. (23° C.) of 17,000–25,000 PSI (1172–1724 Bars), and an Izod impact strength at 73° F. (23° C.) of 1.5–2.5 foot pounds/inch (78–134 joule/meter).

It would be advantageous to have glass fiber strands sized with a sizing composition that adequately protects the strands from interfilament abrasion and yields reinforced polymeric resin material with high tensile strength, flexural strength, and impact strength. Such a sized glass fiber strand would be especially desirable for use in high performance polymers such as the polycarbonate thermoplastic polymer so that the high performance properties of the polycarbonate polymer can be utilized most efficiently to achieve high performance properties in the molded reinforced polycarbonate material.

Such achievements can be made while also achieving ease of processability of the glass fibers in producing glass fibers in their various forms and in producing the reinforced polymeric material, such as by compression molding, injection molding, and the like.

It is an object of the present invention to provide an aqueous sizing composition for glass fibers and to provide the sized glass fibers that yield reinforced polymeric materials having properties such as tensile strength, flexural strength, and impact strengths at the upper end of or greater than the range of these strengths as aforedescribed.

SUMMARY OF THE INVENTION

The aforementioned objects and other objects eclectically gleaned from the following disclosure and claims are accomplished by the present invention.

The present invention is an aqueous sizing composition for treating glass fibers that yields treated glass fiber strands for producing glass fiber reinforced thermoplastics that have improved physical properties. The aqueous sizing composition has present several specific film forming polymers, one or more silane coupling agents, and several specific film former modifiers where these materials interact to accomplish the desired objects and goals. The film forming polymers, which must be present, include an aqueous dispersible emulsifiable or solubilizable polyurethane polymer which may be aromatic, aliphatic or alicyclic in nature, an aqueous dispersible, emulsifiable or solubilizable 1,2-polyepoxide polymer or, in lieu of these two film forming materials or in addition thereto, an aqueous dispersible, emulsifiable or solubilizable epoxidized polyurethane copolymer. The aqueous sizing composition also has an aqueous dispersible, emulsifiable or solubilizable polyethylene-containing polymer. The aqueous treating composition also has an aqueous dispersible, emulsifiable or solubilizable wax and the ratio of the polyethylene-containing polymer to the wax is in the range of about 25:1 to about 1:25. The aqueous treating compositions also has present one or more silane coupling agents, where one silane coupling agent is an amino silane coupling agent and where other coupling agents present may be a lubricant modified amino silane coupling agents or one or more epoxy-containing silane coupling agents.

The aqueous sizing composition is applied to any type of glass fiber known to those skilled in the art for reinforcing polymeric materials. The application of the sizing composition is performed by any method known to those skilled in the art after the molded fibers that are pulled from orifices in a bushing of a glass melting furnace have cooled sufficiently. The sized glass fiber strands can be produced into continuous glass fiber strands for subsequent chopping or for continuous strand reinforcement of polymeric materials, or the sized glass fibers can be chopped directly during forming, a process known as wet chopping, to produce chopped glass fiber strands for polymeric reinforcement.

The types of polymers in which the sized glass fiber strands can be used as reinforcement can be any thermoplastic polymeric material known to those skilled in the art to be reinforceable with glass fibers, although thermosetting polymeric materials known to those skilled in the art can also be used. The sized glass fiber strands have been found most suitable for use as reinforcement in thermoplastic polymers and, particularly, the high performance thermoplastic polymers like polycarbonate and saturated polyesters.

DETAILED DESCRIPTION OF THE INVENTION

It is believed, but the compositions of the present invention are not limited by this belief, that the accomplishment of obtaining increased physical properties in a reinforced polymeric material is achieved with the use of the aqueous sizing composition of the present invention by a unique blend of components constituting the aqueous sizing composition, where each component contributes needed properties. The film forming materials including polyurethane and polyepoxide polymers or copolymers thereof provide a cured and/or evaporative film for the glass fibers and/or strands to assist in holding the filaments together in a bundle of filaments commonly called a strand. In addition, the film forming polymers have functional groups that assist in bonding the filaments to the functional end of the silane coupling agent or the thermoplastic polymer to be reinforced through hydrogen bonding or Van der Walls forces. The silane coupling agents provide bonding to the glass fibers through the hydroxyl groups attached to the silicone atom after the silane coupling agent has been hydrolyzed, or partially hydrolyzed, and provide bonding to the matrix polymer to be reinforced or the film forming polymer through the organic functional group of the silane. The combination of the polyethylene-containing polymer and the wax that may function as film former modifiers provide a slip flow characteristic to the sized glass fiber strands to enable the strands to move relative to each other in processing and to disperse in the thermoplastic or thermosetting polymer matrix to be reinforced during production of the glass fiber reinforced polymers. This slip flow characteristic of the sized glass fiber strands can be measured by mechanical means such as physical flow testing, i.e., funnel flow, bulk density levels, rheological spiral flow characteristics and throughput rates during compounding. All of these are standard tests known to those skilled in the art. The film forming polymers must be compatible with the polymeric matrix to be reinforced and must be synergistic with the other components of the aqueous sizing composition. For these reasons, the aqueous dispersible, emulsifiable or solubilizable polyurethane polymer is used in combination with the aqueous dispersible, emulsifiable or solubilizable polyepoxide polymer.

The polyurethane polymer can be any aqueous dispersible, emulsifiable or solubilizable polymeric reaction product of a polyol, including glycols, and polyisocyanates including diisocyanates with limited formation of allophanate and biuret groups. Nonexclusive examples of suitable polyisocyanates which are employed to produce the polyurethane polymer used with the aqueous sizing composition of the present invention include those having an average NCO functionality of at least about 2, such as, for example, polymethylene polyphenyl isocyanates, suitable organic diisocyanates, for example, 2,3-toluene-diisocyanate, 2,6-toluene-diisocyanate, hexamethylenediisocyanate, P,P'-diphenylmethanediisocyanate, P-phenylenediisocyanate, hydrogenated methylene diphenyldiisocyanate (for example, Hylene ® W), polyisocyanate naphthalene diisocyanate, dianisidine diisocyanate, mixtures of one or more polyisocyanates and the like. Also NCO-containing prepolymers can be used and these include the reaction products of an excess of an organic diisocyanate with polyhydroxyl-containing compounds having from 2 to about 8 OH groups per molecule such as, for example, ethylene glycol, glycerine, trimethylolpropane, pentaerylthritol, sorbitol, sucrose, mixtures thereof and/or with dihydroxyl-containing compound such that the average hydroxyl functionality in the mixture is at least about 2.0. It is preferred that these polyurethanes are liquid, however, in the event that they are solids or semisolids or of a relatively high viscosity such that blending with the other components would be difficult or inconvenient, they may be prepared in a suitable solvent or by melting and then emulsified into an oil-in-water emulsion with suitable surfactants. Nonexclusive examples of suitable polyol or dihydroxyl-containing compounds which may be used in forming the polyurethane include, ethylene glycol, propylene glycol, butylene glycol, pentanediol, hexanediol, diethyleneglycol, dipropylene glycol, bisphenol A, resorcinol, catechol, hydroquinone, mixtures thereof, adducts of a dihydroxyl-containing compound and a viscinal epoxy compound such as, for example, ethyleneoxide, 1,2-propylene oxide, 1,2-butyleneoxide, epichlorohydrin, epibromohydrin, mixtures thereof and the like. When the dihydroxyl-containing compound is a solid, it is suitably employed by either dissolving it in a suitable solvent or melting it and then converting it into an oil-in-water emulsion by use of suitable surfactants and water.

Of this class of polyurethanes, curable, blocked, polyurethane polymers can be used which are aromatic, aliphatic or alicyclic in nature. The emulsions or dispersions are formed by dissolving the polyurethane prepolymer in a nonreactive organic solvent for the polyurethane in a sufficient amount, for example 20-50 percent by weight based upon the weight of the solution, adding sufficient surfactants with the proper HLB range and then gradually mixing the solution with sufficient water to form a stable emulsion of droplets of the solution in the water. These blocked polyurethane resins are formed by the reaction of a polyisocyanate, such as toluene diisocyanate adducts of hydroxyl terminated polyether or polyester resins with an end blocking compound containing active hydrogen atoms such as an amide or polyamide according to conventional techniques for the production of polyurethane resins. The polyisocyanate can be referred to as a prepolymer, i.e., an adduct of a simple diisocyanate with a suitable polyfunctional resin. Particularly suitable polyurethane polymers are those that are substantially aliphatic or alicyclic in nature where the majority of the polyurethane polymeric chain is constituted of aliphatic or hydrogenated aromatic, or alicyclic moieties. Particularly suitable aqueous emulsions of polyurethane polymers are designated "Rucothane ®" latices designated as 2010L, 2020L, 2030L, 2040L, 2050L, and 2060L. These materials are available from the Ruco Division of Hooker Chemical Corporation, New York. These materials are thermoplastic urethane latices having a varying particle size of a high molecular weight aliphatic isocyanate based thermoplastic elastomer in a water dispersion with an anionic or nonionic surfactant. The most preferred polyurethane used is one that is a carboxylated polyurethane to assist in water dispersibility. The Rucothane latices are based on aliphatic components and have a polymer solids content in stable emulsions ranging from 55-65% by weight. The Rucothane latices have a Brookfield viscosity RVF4 in centipoise at 2 RPM ranging from 7,000 for about 2060L and 2030L latices up to 25,000 for the 2020L latex. Another nonexclusive example of a polyurethane polymer that can be prepared is one that is formed from the aliphatic or alicyclic isocyanate available from E. I. DuPont de Nemours and Co. under the trade designation "Hylene W". The amount of the polyurethane polymer used in the aqueous sizing composition is in the range of about 1 to about 10 weight percent of the aqueous sizing composition and about 20 to about 60 weight percent of the solids of the aqueous sizing composition.

A suitable epoxy compound for use in the aqueous sizing of the present invention is one that contains more than one group which has an oxygen atom attached to adjacent carbon atoms, known as an oxirane ring and depicted by the formula

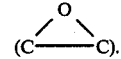

It is well known that epoxy resins may be prepared as a reaction product of a halohydrin and a phenol. One group of polyepoxy compounds which may be used is obtained by the reaction of a stoichiometric excess of an epihalohydrin, such as an epichlorohydrin, with a polyhydric phenol such as bis-(4-hydroxy phenyl)-2,2-propane, bis(hyroxy phenyl) methane (obtained by the acid condensation of two moles of phenol with one mole of formaldehyde), hydroquinone, resorcinol, etc., or with a polyhydroxy alcohol such as glycol, polyethylene glycol, sorbitol, glycerol, etc. The epoxy resin has an epoxy equivalent weight of about 170 to about 900. By varying the proportions of the epihalohydrin and the phenolic polyhydroxic compounds and/or by varying the reaction conditions, compounds of varying epoxide equivalents within this range can be produced which range from liquid to solid, but are preferably liquid. Typically, the molecular weight range can be between about 300 to about 900, and more preferably between about 300 and 600. The epoxy resin or resins can be used in an amount of about 0.1 to about 10 weight percent of the aqueous sizing composition and preferably about 0.2 to about 3.5 percent by weight based on the total weight of the aqueous sizing composition. A particularly suitable epoxy resin for use in the sizing composition of the present invention is designated "Epi-rez CMD 35201" commercially available from Celanese Polymer Specialties Co. This epoxy resin is an epoxy resin dispersion which has 59% nonvolatiles with the only volatile being water and a weight per epoxide of approximately 530, a pH of 8.3 and an average particle size between 1 and 4 microns. This epoxy resin may be cured using any conventional epoxy curing agents with allowance being made for the water environment. Another suitable epoxy resin that can be used is designated "Genepoxy 370-H55" which is commercially available from General Mills Chemical Division.

The copolymers of epoxy and polyurethane, which can be used in the present invention are those formed by use of a polyepoxide prepolymer having one or more oxirane rings and also having open oxirane rings, which are used as the hydroxyl groups for the dihydroxyl-containing compounds for reaction with diisocyanates or polyisocyanates. The amount of an epoxidized polyurethane copolymer used in the aqueous sizing composition would range from about one to about 20 weight percent of the aqueous sizing composition. When the polyurethane polymer and epoxy polymer are used separately in the aqueous sizing composition, any amount in the aforementioned ranges can be used, but the weight ratio of the polyurethane polymer to the epoxy polymer should be in the range of about 90 to 10 to about 10 to 90 and preferably in the range of about 5:1 to about 1:5 with the most preferred range being about 1:1 to about 3:1.

The aqueous dispersible, emulsifiable or solubilizable polyethylene-containing polymer useful in the aqueous sizing composition of the present invention is a polymer that contains predominantly polyethylene but which may also contain a minor portion of polypropylene or degradation derivatives thereof. The aqueous solubilizable or dispersible polyethylene employed in the aqueous sizing composition can be a low density, medium density, or ultra-high molecular weight polyethylene, or thermal or oxidative degradation derivatives thereof. The polyethylenes can be produced by any conventional processes, for example, the high pressure polymerization process, Ziegler process, Phillips process, Standard Oil Process and the like. The thermal oxidation can be conducted by any method known to those skilled in the art and the oxidative degradation can be performed with any oxygen-containing gas like oxygen and/or ozone. The low density polyethylene has highly branched and highly spaced chains, whereas the high density polyethylene and ultra-high molecular weight polyethylene are substantially linear and have closely aligned chains. The branch chained, low density type polyethylene has a specific gravity of around 0.915, crystallinity of 50-60% and it is derived from ethylene which is polymerized in a free radical-initiated liquid phase reaction at elevated pressure and temperature with the use of catalysts. The high density polyethylene has a specific gravity of around 0.95, crystallinity of 90% and is polymerized from ethylene by the use of Ziegler or supported metal oxide catalysts at from one to 100 atmosphere, at from room temperature to 200° F. (93° C.). The ethylene may be copolymerized with varying percentages of 1-olefins or other materials, for example, 1-pentene, 1-butene and the like and 2-butene or acrylic acid and propylene from which a crystalline product results. When the polyethylene is a copolymer of polyethylene and polypropylene with a majority of the copolymer being polyethylene, the polypropylene that is employed has an average molecular weight in the range of about 5,300 to 7,300 and a ring and ball softening point of 150° to 175° C., a density of 0.85 to 1 gram per cubic centimeter and a penetration hardness (100 grams/5 seconds/72° F.) in tenths of a millimeter of 0.01 maximum. The average molecular weight of the starting polyethylene is in the range of about 2,000 to greater than 1.5 million.

When the higher molecular weight polyethylene can not be dispersed, emulsified or solubilized in water by standard techniques, the polyethylene can be degraded by heat or oxidation to reduce the molecular weight. Such standard techniques include emulsifying the polyethylene or polyethylene polypropylene copolymer by melting the polyethylene or polyethylene polypropylene copolymer and adding suitable emulsifying agents. This mixture is stirred and then water is added until the water and oil emulsion inverts to an oil-in-water emulsion. The emulsion contains about 15 to about 40% by weight of solids (non-aqueous ingredients) based upon the weight of the emulsion. Suitable emulsifying agents include Triton X100 surfactants, Igepal CO630 surfactant and Tergitol surfactants and various anionic emulsifying agents. A polyethylene emulsion which is suitable for use in the practice of the present invention is commercially available under the trade designation "Protolube HD" from Proctor Chemical Co., Inc. This material is a nonionic polyethylene emulsion having a solids content of approximately 26%, a pH (1% solution) of approximately 8 and with approximately 75% water which has an appearance of a milky emulsion and an odor of a mild wax.

When the polyethylene is degraded to reduce the molecular weight in order to retain an aqueous dispersible, emulsifiable or solubilizable polyethylene, it is preferred that the degradation occur by a method that reduces the formation of branching and of double bonds in the degraded product. Such a method is to thermally degrade the polyethylene and then oxidatively degrade the polyethylene with a mixture of oxygen and ozone in the presence of low molecular weight polyethylene as shown in U.S. Pat. No. 3,692,877.

The amount of the aqueous dispersible, emulsifiable or solubilizable polyethylene-containing polymer used in the aqueous sizing composition ranges from about 0.1 to about 7 weight percent of the aqueous sizing composition and preferably about 0.1 to about 3 weight percent of the aqueous sizing composition. The amount of the polyethylene-containing polymer on a solids basis in the sizing composition is from around 1 to about 25 weight percent of the solids of the sizing composition.

In addition, the aqueous sizing composition of the present invention has an aqueous soluble, emulsifiable or dispersible wax. The wax may be any suitable wax selected from the group consisting of vegetable waxes, such as carnauba, Japan, bayberry, candelilla, and the like; animal waxes such as beeswax, Chinese wax, hydrogenated sperm oil wax and the like; mineral waxes such as ozocerite, montan, ceresin and the like; and synthetic waxes such as polyalkylenes like polyethylenes, polyethylene glycols, polyethylene esters, chloronaphthalenes, sorbitals; polychlorotrifluoroethylenes; petroleum waxes such as paraffin, microcrystalline waxes and the like. The waxes are preferably those having a high degree of crystallinity and obtained from a paraffinic source, and most preferably are microcrystalline waxes. The microcrystalline waxes usually are branched chain paraffins having a crystal structure much smaller than that of normal wax and also a much higher viscosity and they are obtained by dewaxing tank bottoms, refinery residues and other petroleum waste products. Of these waxes, the most preferred is that having a melting point of about 50° C. or more. The waxes are typically used in the sizing formulation of the instant invention as aqueous dispersions containing 20 to 60 percent by weight wax. In the aqueous sizing formulation of the present invention the wax component is present in an amount of about 0.01 to about 6 and preferably 0.01 to 2 weight percent of the aqueous sizing composition. On a solids basis of the sizing composition, the aqueous dispersible wax is present in an amount of about 0.1 to about 10 preferably about 0.1 to about 4 weight percent. An example of a suitable wax material is that available from Boler Petroleum Co. under the trade designation "518 Emulsion". This material is a thixotropic anionic microcrystalline wax emulsion with a melting point of around 87° C. to 92° C. and a percent solids of around 30±0.5 determined by azotropic distillation and a viscosity at 21° C. of 61±5 centipoise measured according to LVF Brookfield, No. 2 spindle at 60 RPM for 2 minutes, and with a pH at 21° C. of 8.5. Another example of a wax dispersion useful in the compositions of the present invention is that as designated 84630 available from Michelman Chemical Co.

When the polyethylene-containing polymer that is used in the composition of the present invention has a limited amount of branching such as polyethylene with a density greater than around 0.935, the amount of wax present in the composition can be deleted or reduced. The amount of wax can range from 0 to about 2 weight percent of the aqueous sizing composition or from 0 to about 4 weight percent of the solids of the aqueous sizing composition. The polyethylene with limited branching is an aqueous dispersible, emulsifiable, or solubilizable medium density, high density or ultra-high molecular weight polyethylene or a degradation derivative thereof prepared by thermal or oxidative degradation in such a manner as to limit the formation of double bonds and branching in the polymer chain. By limited branching, it is meant that the polydispersity index (Mw/Mn) is less than 10 and preferably less than 3. The polyethylene with limited branching may also contain small amounts of methyl groups on and/or carbon double bonds in the polymer chains.

The aforementioned components of the aqueous sizing composition including the polyurethane, epoxy or epoxypolyurethane copolymer function generally in the sizing composition as film formers. The polyethylene-containing polymer and wax function generally as film former modifiers. These materials generally function to provide a film coating to protect the fibers. In particular, the polyurethane film former provides compatability with the matrix resin in addition to providing film forming characteristics for the strand. The polyepoxide polymer with the intermediate molecular weight range, small average particle size, and good shear stability can also be crosslinked with epoxy hardener to make the film coating less soluble in organic environments as demonstrated by acetone extraction. This polyepoxide also functions as a film forming polymer for the strand but, in addition, provides compatability with the thermoplastic matrix to be reinforced. In addition, these materials also provide functional groups which can provide, by hydrogen bonding or by Van der Wall forces, chemical bonding with the thermoplastic matrix and the glass fiber strand or silane compounds bonded to the glass fiber strands. The polyethylene-containing polymer in conjunction with the wax modifies the film forming characteristic and serves as processing aids which contribute to higher impact strength for the reinforced thermoplastic material. This processing assistance is providing the sized glass fiber strands with a slip/flow characteristic. To achieve this characteristic, the weight ratio of the polyethylene-containing polymer to the wax must be in the range of about 25:1 to about 1:25. A slightly lesser degree of slip flow characteristic can be provided by just the presence of a polyethylene polymer with limited crosslinking. The slip/flow characteristic is measured by a funnel flow test. This test is conducted by placing a predetermined weight of chopped glass fiber strand in a funnel equipped for vibration. The time it takes for the predetermined weight to pass through the vibrating funnel is the funnel flow time. This time can range from several seconds for good slip flow characteristics to several minutes for poorer slip flow characteristics.

The aqueous sizing composition also has one or more silane coupling agents, where at least one silane coupling agent is an amino silane coupling agent. The amino silane coupling agent can be selected from the group of monoamino and diamino silanes. In addition to the amine silane coupling agent, there may be present an amino silane coupling agent modified with any known textile lubricant. Both of these silane coupling agents, when they are monoamino silane coupling agents would have amino functionality which can be designated by the general formula

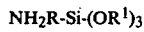

wherein: R is an alkylene radical having from 2 to 8 carbon atoms and $R^1$ is a lower alkyl radical or hydrogen; the lower alkyl radical having 1 to 5 carbon atoms, preferably having 1 or 2 carbon atoms.

Nonexclusive examples of amino silanes include gamma-aminopropyltriethoxysilane, N-(trimethoxy silylpropyl)ethane diamine acrylamide, aminomethyltriethoxysilane, aminopropyltrimethoxysilane, diaminopropyldiethoxysilane, triaminopropylethoxysilane, other similar mono and diamino silanes. In addition to the amino silane, there may be present an epoxy-containing silane coupling agent having a formula such as

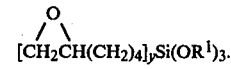

Where $R^1$ is as described above and Y is an integer from 1 to 6. Representative examples of the epoxy silanes include beta-hydroxyethyltriethoxysilane; gamma-hydroxypropyltrichlorosilane; bis-(delta-hydroxybutyl)dimethoxysilane; deltahydroxybutyltrimethoxysilane; 2,3-epoxypropyltrimethoxysilane; 3,4-epoxybutyltriethoxysilane; bis-(2,3-epoxypropyl)dimethoxysilane; glycidoxypropyltrimethoxysilane; and, 3,4-epoxycyclohexyltriethoxysilane. A number of other silanes containing at least one organic group substituted by one or more of an amino group or epoxy group may also be used in the practice of the present invention, and these silanes are well known to those skilled in the art.

As will be appreciated by those skilled in the art, the aforementioned silane coupling agents can be used as the silane coupling agent or its fully or partially hydrolyzed products (silanols) or its polymerization product (polysiloxane). The amount of the silane coupling agent present in the aqueous sizing composition is in the range of about 0.1 to about 2 weight percent of the aqueous sizing composition.

It is preferred to use a mixture of the silane coupling agents which contains the amino silane in a predominant amount of the 0.1 to 2 weight percent of the aqueous sizing composition, and a minor amount of the lubricant modified amino silane coupling agent. The most preferred mixture of the silane coupling agents used in the aqueous sizing composition of the present invention utilizes the amino silane in the predominant amount, the epoxy silane in a minor amount and the lubricant modified amino silane in a smallest amount of the 0.1 to 2 weight percent of the aqueous sizing composition. This mixture of silane coupling agents has in weight percent of the mixture 50 to 95 weight percent of an amino silane coupling agent, about 5 to about 50 weight percent of an epoxy silane coupling agent and about 1 to about 10 weight percent of a lubricant modified amino silane coupling agent.

As can be appreciated by those skilled in the art, additional ingredients can be included in the aqueous sizing composition such as additional film formers, lubricants, wetting agents, surface energy modifiers such as surfactants for facilitating sizing stability, coatability, uniformity, and wettability, and process aids to promote mechanical handling properties during the fabrication and use of resultant sized chopped glass fiber strand product. These agents are generally known to those skilled in the art.

The total solids (non-aqueous) content of the sizing composition is about 1 to about 30% by weight of the size, and it is preferably about 3 to about 10% by weight of the size. In all events, the amounts of the solid components of the aqueous sizing composition should not exceed that amount which will cause the viscosity of the solution to be greater than about 100 centipoise at 20° C. Solutions having a viscosity of greater than 100 centipoise at 20° C. are very difficult to apply to glass fiber strands during their formation without breaking the strand. It is preferred that the viscosity of the size be between 1 and 20 centipoise at 20° C. for best results. The pH of the aqueous sizing composition can be varied from about 4 to about 9.

The aqueous sizing composition is applied to the fibers to obtain a solids application of generally about 0.1 to about 3% by weight based on the total weight of the fibers and the sizing composition, and more preferably between about 0.5 and 2% by weight. The aqueous sizing composition is applied to the glass fibers during the conventional forming process to produce sized continuous glass fiber strands or wet chopped glass fiber strands. In producing continuous glass fiber strands, the sizing composition is applied generally to the fibers prior to the time they are gathered together to form one or more strands by means of any applicator known in the art to contact a liquid with a solid substrate. An example is a roller applicator, which is partially submerged in the sizing composition, contained in a reservoir such as the applicator shown in U.S. Pat. No. 2,728,972, hereby incorporated by reference, while other examples are spray applicators and pad applicators.

The sized glass fibers are gathered into strands by a gathering shoe and wound onto a forming package rotating at a sufficient speed to attenuate the fibers from the orifices in a bushing of a glass fiber batch melting furnace. Although one or more strands may be formed by means other than winding on a forming tube, such as by means of a pair of rotating wheel pullers which direct fibers into a suitable collecting device. An example of such a process is the production of wet chopped glass fiber strands. In this process the glass fibers are drawn from cones of molten glass by attenuation and sized with the aqueous sizing composition. The attenuation is provided by a pair of rotating circumferentially juxposed wheels. As the glass fibers are attenuated by these two wheels, they are also cut or chopped as is more fully explained in U.S. Pat. No. 3,869,268, hereby incorporated by reference. As can be appreciated by those skilled in the art, any conventional method for producing wet chopped glass fiber strands or dry chopped glass fiber strands during the forming process for producing glass fibers can utilize the aqueous sizing composition of the present invention.

When the glass fiber strands are formed by a wet chop glass fiber forming process, and dried in a drier with a high temperature of around 150° C. or higher, and a short residence time of around a second to a few minutes, it is preferred that the aqueous sizing composition used to treat the glass fiber strands contain the mixture of amino silane and epoxy silane coupling agents. The mixture of these silane coupling agents is used in order to achieve good impact properties for the subsequently reinforced thermoplastic polymer even with the rapid drying of the glass fiber strands during their formation. When the glass fiber strands are processed into continuous glass fiber strands, they are dried in conventional drying ovens at the preferred conditions of temperatures around 110° C. to around 150° C. for around 11 hours. Other time/temperature relationships can be used as long as they give equivalent drying to remove a substantial amount of moisture and set the cure of the sizing composition as a coating. After this drying step, the continuous glass fiber strands can be chopped or processed into roving or any other desired construction for reinforcement of thermoplastic or thermosetting polymers.

In preparing reinforced thermoplastic materials, the thermoplastic polymers that can be reinforced with the sized glass fiber strands of the present invention can be any thermoplastic polymer, but the polar thermoplastic polymers are preferably used. Nonexclusive examples of these include polyamides, polyphenylsulfides, polycarbonates, polyolefins, polystyrene, acetal resins, and styrene acrylonitrile copolymers and terpolymers with butadiene. The sized glass fiber strands can be combined with the thermoplastic polymer to be reinforced by any conventional method known to those skilled in the art. Any mixing apparatus generally used by those skilled in the art for producing reinforced thermoplastic polymers can be utilized. The chopped sized glass fiber strands can be compounded with the thermoplastic polymer and molded by any conventional molding process such as injection molding, rotational molding, compression and extrusion molding. Generally, in injection molding a standard plunger or screw injection-molding apparatus can be used. When the sized glass fiber strands are continuous, continuous glass fiber strand mats can be formed and used in compression molding of the thermoplastic material. The amount of glass fiber strands combined with the thermoplastic polymer can range from around 1 weight percent of the reinforced thermoplastic polymer to around 50 percent by weight.

PREFERRED EMBODIMENT

In the preferred embodiment of the present invention, the aqueous sizing composition is formulated and used to treat glass fibers that are formed into wet chopped glass fiber strand for reinforcement of polycarbonate. The aqueous sizing composition has the following formulation:

| | Component | Amount in Solid Weight % | Amount in Aqueous Weight % |
|---|---|---|---|
| (1) | Water for numbers (2) and (3) | 10–50 percent of total volume | 10–50 percent of total volume |
| (2) | Gamma amino propyltriethoxy-silane (A-1100) | 2 to 7 | .05 to 1 |
| (3) | Lubricant modified gamma aminopropyl-triethoxysilane (A-1108) | .05 to 1 | .005 to 1 |
| (4) | Acetic acid to adjust pH to 7.5 ± 1.0 | | |
| (5) | Gamma glycidoxy-propyltrimethoxy-silane (A-187) | 0.5 to 3 | 0.05 to 1 |
| (6) | Cold water for the gamma-glycidoxy-propyltrimethoxy-silane | 1 to 60 liters | |
| (7) | Substantially aliphatic poly-urethane polymer with a small amount of carboxyla-tion (Rucothane 2010L) | 5 to 60 | 1 to 5 |
| (8) | Polyethylene containing polymer (aqueous emulsion available as Protolube HD) | 5 to 20 | 0.1 to 3 |
| (9) | Epoxy polymer (aqueous dispersion available as CMD 35201) | 5 to 60 | 1 to 5 |
| (10) | Microcrystalline wax with a melting point | .5 to 3 | 0.01 to 1 |

-continued

| Component | Amount in Solid Weight % | Amount in Aqueous Weight % |
|---|---|---|
| greater than 70° C. (available as Boler 518 Wax Emulsion) | | |

The aforementioned formulation was prepared into a sizing composition by first adding deionized water to a mix tank having stirring capabilities. The amount of water added to the mix tank is around 10 to 50 percent of the total volume of the sizing composition. The gamma-amino-propyltriethoxysilane available as A1100 from Union Carbide Corporation was added to the mix tank with agitation for several minutes. The lubricant modified gamma-aminotriethoxysilane available from Union Carbide under the trade designation A-1108 which was added to the mix tank and agitated for several minutes. The pH was adjusted to around 6.5 to 8.5 with diluted (50/50) acetic acid. A small amount of water was added to a premix tank and the gamma-glycidoxypropyltrimethoxysilane available from Union Carbide Corporation under the trade designation A187 was added to the premix tank and the mixture was then added to the main mix tank. The main mix tank at this point contained a mixture of the silane coupling agents to be used in the aqueous sizing composition. The polyurethane polymer which is substantially aliphatic or alicyclic, is available from Hooker Chemical Company under the trade designation Rucothane aqueous emulsion. The polyethylene-containing polymer which is a high density polyethylene emulsified into an aqueous emulsion available from Proctor Chemical Company under the trade designation Protolube HD is added to the main mix tank. The polyepoxide polymer as an aqueous solution available from Celanese Specialties Chemical Company under the trade designation CMD35201 having a weight per epoxide of around 530 was added to the main mix tank. The microcrystalline wax available as an emulsion designated "Emulsion 518" with a melting point in the range of about 85° to about 95° was added the the main mix tank. The mixture in the main mix tank was then diluted to the final desired volume and allowed to agitate for several minutes.

The aqueous sizing composition was used to treat glass fibers having a filament diameter of 13.34±0.63 microns gathered into strands having 500 to 1000 filaments per strand and chopped during formation into chopped glass fiber strand having lengths ranging from ⅛" to ¼ inch. The LOI (Loss On Ignition) of the chopped strand ranged from 0.6 to 1.25 percent. This chopped glass fiber strand was used in injection molding to reinforce polycarbonate resin.

Additional examples of carrying out the invention are shown in the following examples of the aqueous sizing compositions.

Table I presents five examples of aqueous sizing compositions. All the aqueous sizing compositions were formulated as taught in the preferred embodiment.

Examples 1 and 2 were used to prepare continuous sized glass fiber strands which were subsequently chopped for reinforcing polycarbonate resin. The sizing compositions of Examples 3, 4, and 5 were applied to glass fibers produced into wet chopped glass fiber strand and subsequently used to reinforce polycarbonate resin. Table II presents data showing physical properties of reinforced polycarbonate polymer. The polycarbonate resin was reinforced with the glass content depicted in Table II by extrusion molding into placques.

TABLE I

| | Example 1 | Example 2 | Example 3 | Example 4 | Example 5 |
|---|---|---|---|---|---|
| Total Volume | 189.25 liters | 189.25 liters | 189.25 liters | 378.5 liters | 189.25 liters |
| Components - kilograms | | | | | |
| Gamma-glycidoxy-propyl-trimethoxy-silane A-187 | — | 0.5 | — | 1.0 | — |
| Water | — | — | — | 45.4 liters | — |
| Gamma-aminopropyl-triethoxy silane A-1100 | 1.0 | 0.5 | 1.0 | 3.3 | 0.2 |
| Lubricant modified gamma-aminopropyl-triethoxy silane (A-1108) | .04 | 0.4 | 0.4 | 0.18 | 0.008 |
| Acetic Acid, pH adjustment | 0.29 | 0.29 | 0.29 | 1.01 | 0.04 |
| Polyurethane emulsion (2010L) | 10.0 | 10 | 10 | 26.6 | 2.0 |
| Polyethylene emulsion (Protolube HD) | 5 | 10 | 10 | 13.3 | 2.0 |
| Microcrystalline Wax m.p. 87–92° C. (Boler 518) | 0.6 | 0.6 | 0.6 | 1.6 | 0.12 |
| Epoxy polymer emulsion A (CMD 35201) | 10.0 | 10.0 | 10 | 26.6 | 2.0 |
| Percent Solids | 7.25 | 8.03 | 7.9 | 10.4 ± 0.6 | 9.8 |
| Sized Chopped Glass Fiber Strand | | | | | |
| Type of Glass Fiber Strand | K-37 | K-37 | K-6.75 | K-6.75 | K-6.75 |
| LOI (%) | 1.13 | 1.29 | .7 | 0.75 | .75 |
| Bulk density lb/ft$^3$ | 34 | 34.9 | 35.3 | 43 | 37 |
| Funnel Flow, sec./1 kg. | 4 | 5.5 | 5 | 4.5 | 5 |
| Strand Integrity for Chopping | Excellent | Excellent | Excellent | Excellent | Excellent |

The funnel flow test was conducted by placing a given quantity of the chopped glass fiber strands either dry chopped or dried wet chop in a funnel equipped for vibration. The time it took the total weight to pass through the funnel was recorded.

The bulk density test measures slip flow characteristic in relation to compaction of chopped glass fiber strands. Compaction comes into play in molding reinforced thermoplastic polymeric materials. Bulk density is measured by filling a test tube with known volume with chopped glass fiber strands. The test tube is placed on a shaker and the volume occupied by the strands after shaking is recorded. Higher volumes indicate better bulk density.

In Table II, tensile strength, flexural strength, flexural modulus and Izod impact tests were conducted according to test methods of the American Society of Testing and Materials (ASTM). These tests included respectively D-638, D-790, D-790 and D-256.

TABLE II

PROPERTIES OF POLYCARBONATE[1] REINFORCED WITH
GLASS FIBER STRAND PRODUCED AS SHOWN
IN TABLE I

| Glass Fiber Strand | Glass Content % | Tensile Strength PSI × $10^3$ (Grams per cm.$^2$ × $10^3$) | Flexural Strength PSI × $10^3$ (Grams per cm.$^2$ × 10) | Flexural Modulus PSI × $10^6$ (Grams per cm.$^2$ × $10^6$) | Izod Impact Ft/lb/In (Joules/cm) |
|---|---|---|---|---|---|
| ASTM Test Method | | D-638 | D-790 | D-790 | D-256 |
| 1. Published Short fiber | 20 | 12–18.5 (843.6–1300.6) | 17–25 (1195.1–1757.5) | — | 1.5–2.5 (105.5–175.8) |
| 2. ¼ inch K-37 with size of Example 1 | 20 | 19.1 (1342.7) | 26.8 (1884.0) | 0.901 (63.3) | 2.78 (195.4) |
| 3. ¼ inch K-37 with size of Example 3 | 20 | 19.4 (1363.8) | 27.2 (1912.2) | 0.907 (63.8) | 2.85 (200.4) |
| 4. ¼ inch M fibers 4.8 with size of Example 4 | 20 | 17.4 (1223.2) | 25.2 (1771.6) | 0.859 (60.4) | 2.57 (180.7) |
| 5. ¼ inch K-37 with size of Example 1 | 34.5 | 18.7 (1314.6) | 25.6 (1799.7) | 1.0 (70.3) | 1.97 (138.5) |
| 6. ⅛ inch K-37 with size of Example 1 | 33.9 | 18.2 (1279.5) | 24 (1687.2) | 1.0 (70.3) | 2.04 (143.4) |
| 7. ¼ inch K-37 with size of Example 2 | 31.9 | 21.0 (1476.3) | 28.4 (1996.5) | 1.04 (73.1) | 2.9 (203.9) |
| 8. ⅛ inch K-37 with size of Example 2 | 32.3 | 20.1 (1413.0) | 28.7 (2017.6) | 1.0 (70.3) | 3.0 (210.9) |
| 9. ¼ inch K-6.75 with size of Example 4 formed by wet chop process | 30 | 18.3 (1286.5) | 26 (1827.8) | 1.06 (74.5) | 2.61 (183.5) |
| 10. ⅛ inch K-6.75 with size of Example 4 formed by wet chop process | 35 | 18.4 (1293.5) | 24 (1687.2) | .95 (66.8) | 2.41 (169.4) |
| 11. ¼ inch M-4.8 with size of Example 4 | 20 | 16.4 (1152.9) | 25.4 (1785.6) | 0.94 (66.1) | 2.3 (161.7) |

[1]Polycarbonate resin was LEXAN ®-141-111 polycarbonate from General Electric.

As is shown in the data of Tables I and II, the sized glass fiber strands of the present invention lead to high integrity chopped strand products that also have good slip/flow characteristics. The epoxy polymer contributes to the high abrasion resistance of the strands, while the polyurethane and film former modifiers, polyethylene-containing polymer and wax contribute to the high impact properties in the resultant glass fiber reinforced thermoplastic polymer.

The foregoing has described an aqueous sizing composition and sized glass fiber strand made therefrom that can be used in reinforcing thermoplastic polymers to yield reinforced thermoplastics with higher strength properties. This result is obtained from the components in the aqueous sizing composition which include a polyurethane polymer, an epoxy polymer, a polyethylene-containing polymer, a wax, an amino silane alone or in combination with a lubricant modified amino silane and/or an epoxy containing silane coupling agent. The aqueous sizing composition is applied to glass fibers for production of wet chopped glass fiber strand or dry chopped glass fiber strand. The chopped glass fiber strand can then be blended with the thermoplastic polymer and molded into the desired shape.

We claim:

1. An aqueous sizing composition for glass fibers used for reinforcing polymers, comprising:
   a. a polyurethane polymer,
   b. a epoxy polymer,
   c. a polyethylene-containing polymer,
   d. wax where the weight ratio of the polyethylene-containing polymer to wax is in the range of about 25 to 1 to about 1 to 25, and
   e. an amino silane coupling agent, and
   f. water in an amount to give a total solids content for the composition in the range of about 1 to about 30 weight percent.

2. Aqueous sizing composition of claim 1 wherein the polyurethane polymer is substantially aliphatic and/or alicyclic.

3. Aqueous sizing composition of claim 1 which includes a lubricant modified amino silane coupling agent.

4. Aqueous sizing composition of claim 1 which includes an epoxy containing silane coupling agent.

5. Aqueous sizing composition according to claim 1 wherein the polyurethane and epoxy polymers are present as an epoxidized polyurethane copolymer.

6. Aqueous sizing composition of claim 1 wherein the polyurethane polymer has carboxylation.

7. Epoxy polymer of claim 1 that has a molecular weight in the range of about 170 to 900 (number average or weight average).

8. Aqueous sizing composition of claim 1 wherein the polyethylene-containing polymer is selected from high density polyethylene, medium density polyethylene, low density polyethylene, ultra-high molecular weight polyethylene, polyethylene-1-olefin copolymers and polyethylene, polypropylene copolymer where polyethylene is present in the major amount in the copolymers and degradation derivatives thereof.

9. Aqueous sizing composition of claim 1 wherein the wax has a melting point above about 50° C.

10. Aqueous sizing composition of claim 1 wherein the amino silane is gamma-aminopropyltriethoxy silane.

11. Aqueous sizing composition of claim 1 wherein the lubricant modified amino silane coupling agent is gamma-aminopropyltriethoxy silane.

12. Aqueous sizing composition of claim 1 wherein the epoxy-containing silane is gamma-glycidylpropyl-trimethoxysilane.

13. Sized glass fiber strand containing the aqueous sizing composition of claim 1.

14. Dried chopped glass fiber strands having an LOI in the range of about 0.1 to 3 of the sizing composition of claim 1.

15. Wet chopped glass fiber strands having the aqueous sizing composition of claim 1.

16. Reinforced thermoplastic polymer having the sized glass fibers of claim 14 or 15.

17. Reinforced thermoplastic polymer of claim 16 wherein the thermoplastic polymer is selected from polypropylene; polyamide; saturated polyesters including polyethylene terephthalate and polybutylene terephthalate; polystyrene; phenoxy polyphenylene oxide; polyphenylene sulfide; polycarbonate, and acrylonitrile-butadiene-styrene terpolymer.

18. Aqueous sizing composition for glass fibers used to reinforce thermoplastic polymers, comprising:
  a. aqueous dispersion of substantially aliphatic and/or alicyclic polyurethane polymer,
  b. aqueous dispersion of 1,2-polyepoxide polymer with a molecular weight in the range of 170 to 900, where the weight ratio of polyurethane to epoxy is in the range of about 1 to about 10 to about 10 to about 1,
  c. aqueous dispersion of polyethylene-containing polymers selected from the group consisting of low density polyethylene, medium density polyethylene, high density polyethylene, ultra-high molecular weight polyethylene and polyethylene-polypropylene copolymer and polyethylene-1-olefin copolymer where polyethylene is present in a predominant amount of the copolymer and degradation derivatives thereof,
  d. paraffin wax with a melting point greater than 50° C.,
  e. mixture of silane coupling agents having in weight percent of the mixture: 50 to about 95 weight percent of an amino silane coupling agent, about 5 to about 50 weight percent of an epoxy silane coupling agent and about 1 to about 10 weight percent of a lubricant modified amino silane coupling agent.
  f. water in an amount to give a total solids for the composition in the range of about 1 to about 30 weight percent.

19. Aqueous sizing composition according to claim 18 wherein the polyurethane polymer contains carboxyl moieties.

20. Aqueous sizing composition of claim 18, wherein the epoxy polymer has a weight per epoxide of around 530.

21. Aqueous sizing composition of claim 18 wherein the amino silane is gamma-aminopropyltriethoxy silane and the epoxy silane is gamma-glycidoxy propyltrimethoxy silane.

22. Chopped glass fiber strand having the dried residue of the aqueous sizing composition of claim 18.

23. Chopped glass fiber strand having the aqueous sizing composition of claim 18.

24. Thermoplastic polymer reinforced with the glass fiber strands of claim 22 or 23 wherein the thermoplastic polymer is selected from the group consisting of polypropylene; polyamide; saturated polyester; including polyethylene terephthalate and polybutylene terephthalate; polystyrene; phenoxy; polyphenylene oxide; polyphenylene sulfide, polycarbonate, and acrylonitrile, styrene-butadiene-terpolymers.

25. Aqueous sizing composition for glass fibers produced in wet chopped forming process to reinforce thermoplastic polymer, comprising in weight percent of the aqueous sizing composition:
  a. about 0.1 to about 10 weight percent of substantially aliphatic and/or alicyclic polyurethane polymer having carboxyl moieties,
  b. about 0.1 to about 10 weight percent of a polyepoxide polymer with a molecular weight in the range of about 170 to about 900 wherein the weight ratio of the polyurethane to the epoxy polymer is about 5 to about 1 to about 1 to about 5,
  c. about 0.1 to about 7 weight percent of an aqueous dispersible, emulsifiable or solubilizable high density polyethylene polymer,
  d. about 0.01 to about 6 weight percent of a microcrystalline paraffinic wax having a melting point above about 50° C., wherein the weight ratio of the polyethylene polymer to the wax is in the range of about 25 to 1 to about 1 to 25,
  e. mixture of silane coupling agents in an amount of about 0.1 to about 2 weight percent with a predominant amount being gamma-aminopropyltriethoxysilane, and with a minor amount being gamma-glycidoxypropyl-trimethoxysilane and with the smallest amount being a lubricant modified gamma-aminopropyltriethoxy silane,
  f. water in an amount sufficient to give a total solids for the aqueous sizing composition in the range of about 2 to about 20 weight percent.

26. Chopped glass fiber strands having the dried residue of the aqueous sizing composition of claim 25.

27. An aqueous sizing composition for treating glass fibers useful in reinforcing thermoplastic polymers, comprising:
  a. polyurethane polymer,
  b. epoxy polymer,
  c. polyethylene-containing polymer with limited branching,
  d. amino-silane coupling agent, and
  e. water in an amount to give a total solids for the composition in the range of 1 to about 30 weight percent.

28. Glass fibers sized with the aqueous treating composition of claim 27.

* * * * *

UNITED STATES PATENT AND TRADEMARK OFFICE
CERTIFICATE OF CORRECTION

PATENT NO. : 4,374,177

DATED : February 15, 1983

INVENTOR(S) : Ed C. Hsu, L. Dow Moore and Chester S. Temple

It is certified that error appears in the above-identified patent and that said Letters Patent is hereby corrected as shown below:

Column 11, line 40, delete the term "juxposed" and insert therefor --juxtaposed--;

Column 13, line 17, delete "gamma-aminotriethoxysilane" and insert therefor --gamma-aminopropyltriethoxysilane--;

Column 15, line 45, add --,-- after the word "wax";

Column 15, Claim 1, line 67, subparagraph b., delete the word "a" and insert therefor --an--;

Column 16, Claim 11, line 66, delete the number "1" and insert therefor --3--;

Column 17, Claim 12, line 1, delete the number "1" and insert therefor --4--;

UNITED STATES PATENT AND TRADEMARK OFFICE
CERTIFICATE OF CORRECTION

PATENT NO. : 4,374,177

DATED : February 15, 1983

INVENTOR(S) : Ed C. Hsu, L. Dow Moore and Chester S. Temple

Page 2 of 2

It is certified that error appears in the above-identified patent and that said Letters Patent is hereby corrected as shown below:

Column 17, Claim 12, line 2, delete the term "gamma-glycidyl-propyltrimethoxysilane" and insert therefor --gamma-glycidoxypropyltrimethoxysilane--;

Column 17, Claim 18, line 48, subparagraph e., delete "." and insert therefor --,--.

Signed and Sealed this

Twenty-third Day of August 1983

[SEAL]

Attest:

GERALD J. MOSSINGHOFF

Attesting Officer

Commissioner of Patents and Trademarks